(12) United States Patent
Lu

(10) Patent No.: US 11,440,619 B2
(45) Date of Patent: Sep. 13, 2022

(54) INTELLIGENT SAFETY FRAME CAPABLE OF EASILY REPLACING AND PROTECTING BATTERY

(71) Applicant: Zhejiang Okai Vehicle Co., Ltd., Lishui (CN)

(72) Inventor: Jiangtao Lu, Lishui (CN)

(73) Assignee: Zhejiang Okai Vehicle Co., Ltd., Lishui (CN)

( * ) Notice: Subject to any disclaimer, the term of this patent is extended or adjusted under 35 U.S.C. 154(b) by 147 days.

(21) Appl. No.: 16/948,168

(22) Filed: Sep. 4, 2020

(65) Prior Publication Data
US 2021/0323635 A1    Oct. 21, 2021

(30) Foreign Application Priority Data
Apr. 17, 2020   (CN) .......................... 202020585341.0

(51) Int. Cl.
*B62M 6/90* (2010.01)
*B62J 43/28* (2020.01)
*B62J 1/28* (2006.01)
*B62J 11/19* (2020.01)

(52) U.S. Cl.
CPC .................. *B62M 6/90* (2013.01); *B62J 1/28* (2013.01); *B62J 11/19* (2020.02); *B62J 43/28* (2020.02); *B62K 2202/00* (2013.01)

(58) Field of Classification Search
CPC .. B62M 6/90; B62K 2204/00; B62K 2202/00; B62K 19/44; B62J 43/00; B62J 43/10; B62J 43/13; B62J 43/16; B62J 43/20; B62J 43/28; B62J 1/12; B62J 1/28; B62J 1/08; B62J 9/10; B62J 9/14; B62J 11/10; B62J 11/19
See application file for complete search history.

(56) References Cited

U.S. PATENT DOCUMENTS

| | | | | |
|---|---|---|---|---|
| 8,915,323 | B2* | 12/2014 | Tsujii | ........................ B62K 5/06 180/312 |
| 10,577,044 | B1* | 3/2020 | Kejha | ........................ B60K 5/00 |
| D937,134 | S * | 11/2021 | Lu | .................................. 12/111 |
| 2013/0288841 | A1* | 10/2013 | Yoshino | .................. B60L 50/66 475/149 |

(Continued)

FOREIGN PATENT DOCUMENTS

| | | | | |
|---|---|---|---|---|
| JP | 2011-93510 | * | 5/2012 | ............. B62K 11/10 |
| JP | 2019-202611 | * | 11/2019 | ............. B62M 6/90 |

*Primary Examiner* — Anne Marie M Boehler
(74) *Attorney, Agent, or Firm* — Schwegman Lundberg & Woessner, P.A.

(57) ABSTRACT

An intelligent safety frame capable of easily replacing and protecting battery includes a front beam, a battery mounting box, a rear beam, a cushion mounting seat and a rear tail box mounting seat, wherein a rear tail box is mounted on the rear tail box mounting seat, the cushion mounting seat is rotatably mounted on the rear beam, a battery mounting cavity is defined in the battery mounting box, a threading box is provided on a side of the battery mounting box, a first wire-in cavity is provided in the threading box, a first threading slot is provided on a side of the battery mounting cavity, a wire outlet is provided on a side of the threading box, a second intelligent lock mounting slot is provided at the upper end of the rear beam, and a lock catch is provided on a side of the cushion mounting seat.

10 Claims, 4 Drawing Sheets

(56) References Cited

U.S. PATENT DOCUMENTS

| | | | |
|---|---|---|---|
| 2015/0210339 A1* | 7/2015 | Igarashi | B62K 25/04 |
| | | | 180/220 |
| 2019/0039687 A1* | 2/2019 | Lay | B62K 19/02 |
| 2020/0047841 A1* | 2/2020 | Luckjohn | B62K 19/46 |
| 2020/0398918 A1* | 12/2020 | Buell | B62J 45/10 |
| 2021/0276653 A1* | 9/2021 | Caroselli, III | B62J 43/28 |
| 2022/0033024 A1* | 2/2022 | Okabe | B60L 50/64 |

* cited by examiner

INTELLIGENT SAFETY FRAME CAPABLE OF EASILY REPLACING AND PROTECTING BATTERY

CROSS-REFERENCE TO RELATED APPLICATIONS

This Non-provisional application claims priority under 35 U.S.C. § 119(a) to Chinese Patent Application No. 202020585341.0 filed on Apr. 17, 2020, the entire contents of which are hereby incorporated by reference in their entirety.

TECHNICAL FIELD

The invention relates to a technical field of an electric vehicle, in particular to an intelligent safety frame capable of easily replacing and protecting battery.

BACKGROUND ART

A frame of the electric vehicle is an installation base for various assemblies of the electric vehicle, which connects the motor, battery box, body and other assemblies of the electric vehicle into an organic integrity, i.e. assembles all the assemblies to be a complete electric vehicle, in which the frame of the electric vehicle bears all the mass of various assemblies of the electric vehicle and payloads, as well as all kinds of forces and moments generated when the electric vehicle is running, thus presenting a relatively high design requirements. For the current frame of the electric vehicle on the market, battery installation and wire distribution are in a derangement, ignition often occurs in the battery due to over-heating of the wires, and detachment and replacement of the battery are not convenient; in addition, the derangement of a wiring layout also causes the overall structure of the frame to be bloated; therefore, an intelligent safety frame capable of easily replacing and protecting battery is continuously developed to solve problems in the prior art.

SUMMARY

The object of this invention is to provide an intelligent safety frame capable of easily replacing and protecting battery, so as to solve the problems mentioned in the background art.

In order to achieve the above purpose, the invention provides the following technical scheme:

An intelligent safety frame capable of easily replacing and protecting battery comprises a front beam connected with a handlebar, a battery mounting box, a rear beam connected with the front beam, a cushion mounting seat mounted on the rear beam and a rear tail box mounting seat mounted on the rear beam, wherein a rear tail box is mounted on the rear tail box mounting seat, the cushion mounting seat is rotatably mounted on the rear beam, a battery mounting cavity is defined in the battery mounting box, a threading box is provided on a side of the battery mounting box, a first wire-in cavity is provided in the threading box, a first threading slot is provided on a side of the battery mounting cavity close to the first wire-in cavity, a wire outlet communicated with the first wire-in cavity is provided on a side of the threading box, a first intelligent lock mounting slot is provided at the upper end of the rear beam, and a lock catch for fixing the cushion mounting seat on the rear beam is provided on a side of the cushion mounting seat close to the rear beam.

As a further scheme of the invention, a second threading slot is provided on a side of the first wire-in cavity close to the first intelligent lock mounting slot.

As a further scheme of the invention, a second wire-in cavity is defined in the front beam, a second intelligent lock mounting slot communicated with the second wire-in cavity is provided on a side of the front beam, and a third threading slot is provided on a side of the first wire-in cavity close to the second wire-in cavity.

As a further scheme of the invention, handles are provided on both sides of the rear beam.

As a further scheme of the invention, the rear tail box mounting seat comprises a bearing plate and a fixing collar, the rear tail box comprises a rear tail box body and a loading cavity, wherein the rear tail box body is mounted on the bearing plate and fixed by the fixing collar.

As a further scheme of the invention, a plurality of hollows are provided on the bearing plate.

As a further scheme of the invention, a limiting table is provided on a side of the rear tail box body close to the bearing plate, and a bearing table for mounting the limiting table is provided at the upper end of the bearing plate.

As a further scheme of the invention, a plurality of reinforcing ribs are provided on a side of the bearing table close to the rear tail box body, and a first limiting slot for an insertion of the reinforcing ribs is provided on a side of the limiting table close to the bearing table.

As a further scheme of the invention, a second limiting slot sheathed by a fixing collar is provided on the rear tail box body.

As a further scheme of the invention, the threading box is mounted on a side of the battery mounting box.

Compared with the prior art, the invention provides the beneficial effects that connecting wires of the battery are set separately from controlling wirings connected with the battery and power supply wires in different zones by leading the connecting wires out from the first threading slot which is provided on a side of the battery mounting box, and through the first wire-in cavity and to the wire outlet, which not only protects the battery but also facilitates the detachment of the battery; a modularized region layout for the wires and the battery is also achieved, making the whole frame structure more compact; in addition, the whole cushion mounting seat ensures that a passage for the battery installation and a passage for the internal wires are shielded and realizes a theft prevention function; furthermore, the first intelligent lock mounting slot at the upper end of the rear beam can also be protected by the cushion mounting seat; and the frame not only is compact in structure, but also realizes a separate arrangement of the battery and the wires in different zones, which ensures the safety of the battery in use.

Figure 1:
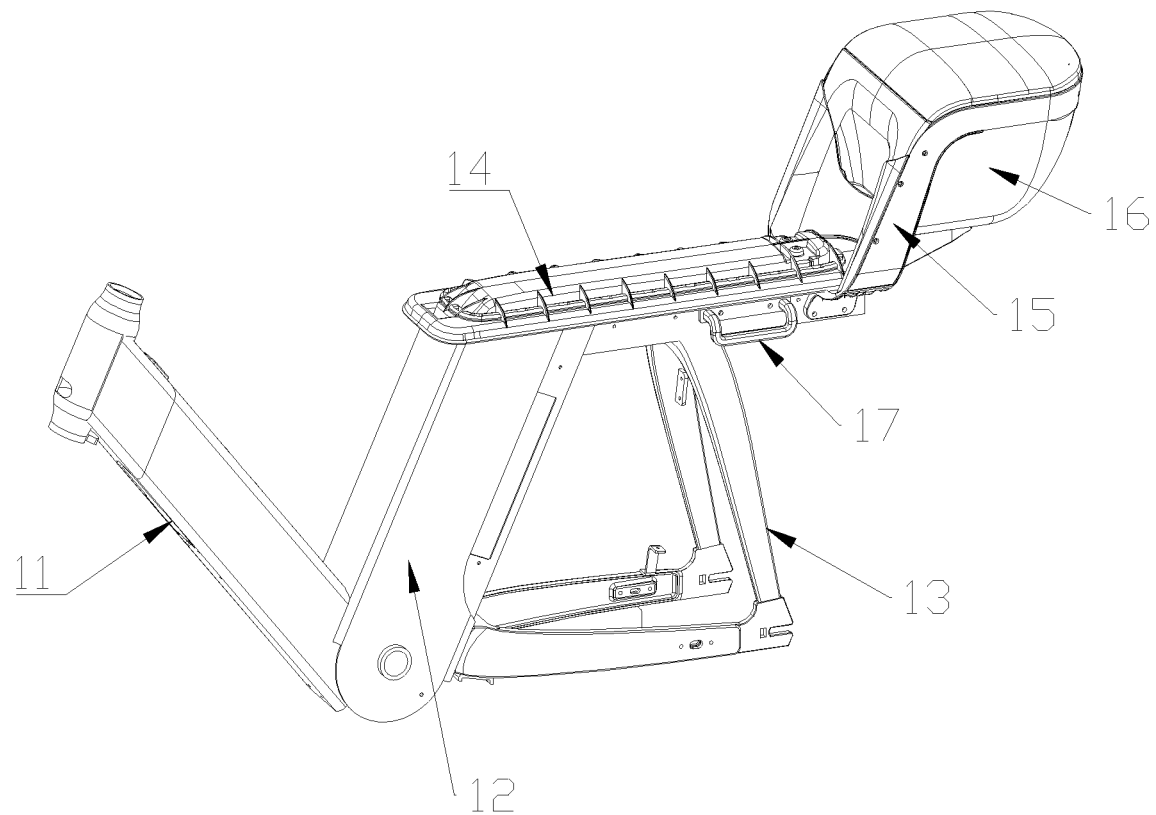
FIG. 1 is a schematic structural view from a first perspective of the intelligent safety frame capable of easily replacing and protecting battery according to the invention.

In the drawings: 11. Front Beam; 1101. Second Intelligent Lock Mounting slot; 1102. Second Wire-in Cavity; 12. Battery Mounting Box; 1201. Battery Mounting Cavity; 1202. Threading Slot; 13. Rear Beam; 1301. First Intelligent Lock Mounting slot; 14. Cushion Mounting Seat; 15. Rear Tail Box Mounting Seat; 1501. Bearing plate; 1502. Hollows; 1503. Fixing collar; 1504. Reinforcing Rib; 1505. bearing table; 16. Rear Tail Box; 1601. Rear Tail Box Body; 1602. Loading Cavity; 1603. First Limiting Slot; 1604. Bearing Surface; 1605. Limiting table; 1606. Second limiting Slot; 17. Handle; 18. Lock Catch; 19. Threading Box; 1901. Wire Outlet; 1902. First Wire-in Cavity; 1903. Second Threading Slot.

DETAILED DESCRIPTION OF PREFERRED EMBODIMENTS

In the following, the technical scheme in the embodiment of the invention will be described clearly and completely in connection with the drawings; obviously, the described embodiment is intended to be only a part of the embodiment of the invention, but not all of them. Based on the embodiments of the invention, all other embodiments obtained by ordinary technicians in the art without creative efforts are within the protection scope of the invention.

Figure 2:
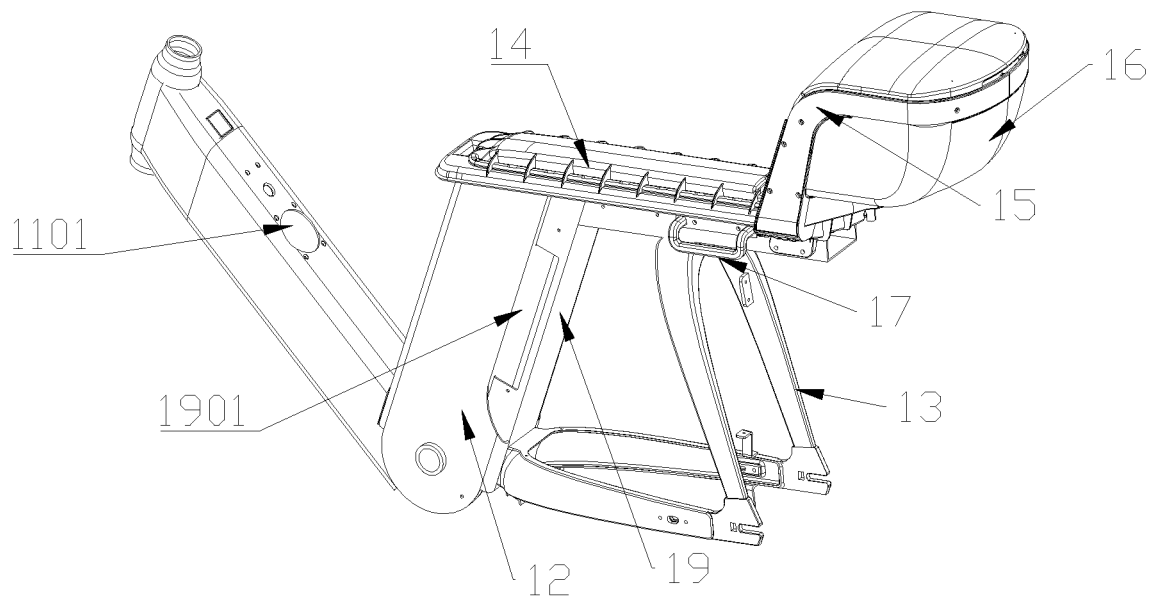
FIG. 2 is a schematic structural view from a second perspective of the intelligent safety frame capable of easily replacing and protecting battery according to the invention.
Figure 3:
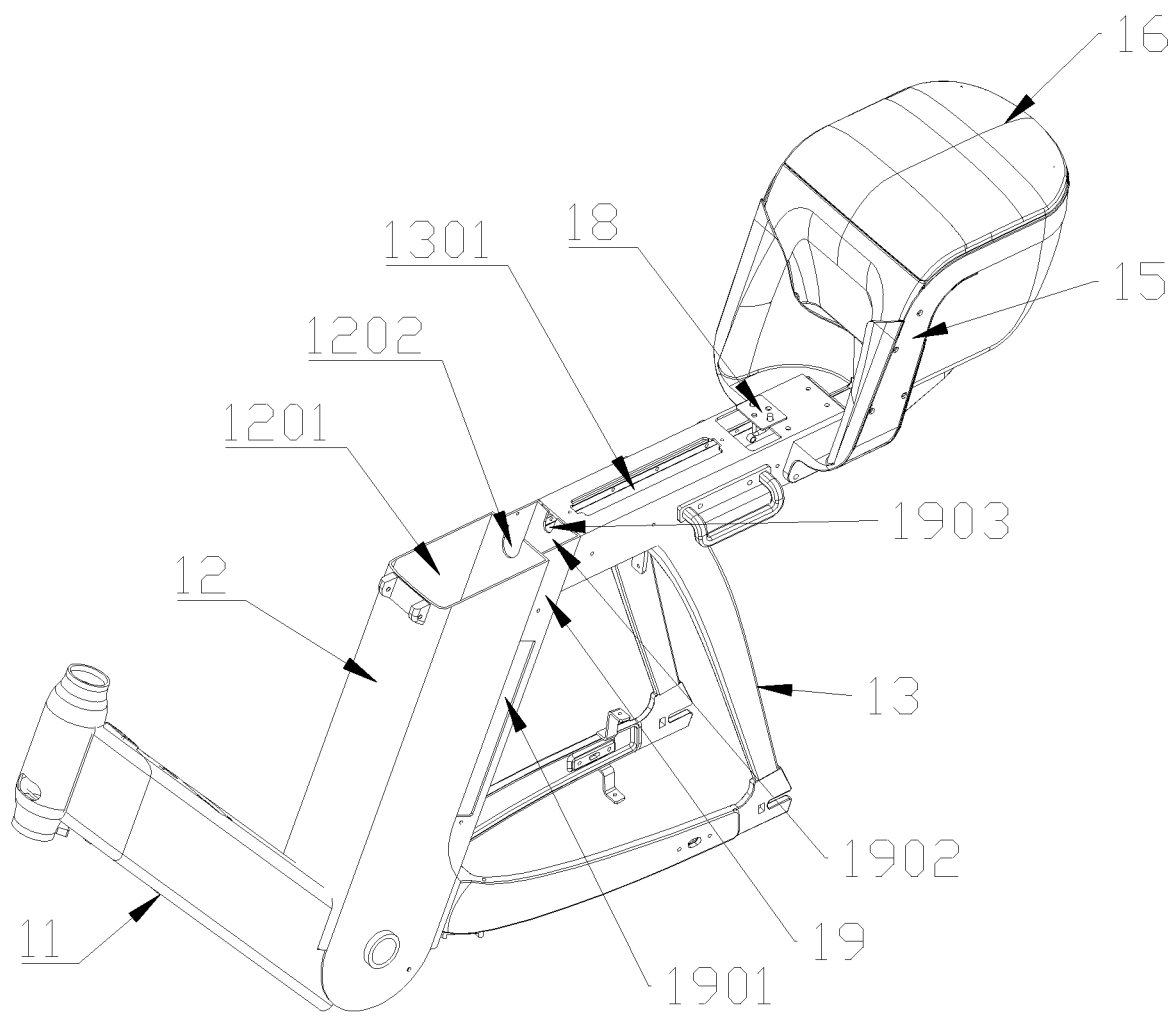
FIG. 3 is a schematic structural diagram of an intelligent safety frame, which is capable of easily replacing and protecting battery, without a cushion mounting seat, according to the invention.
Figure 4:
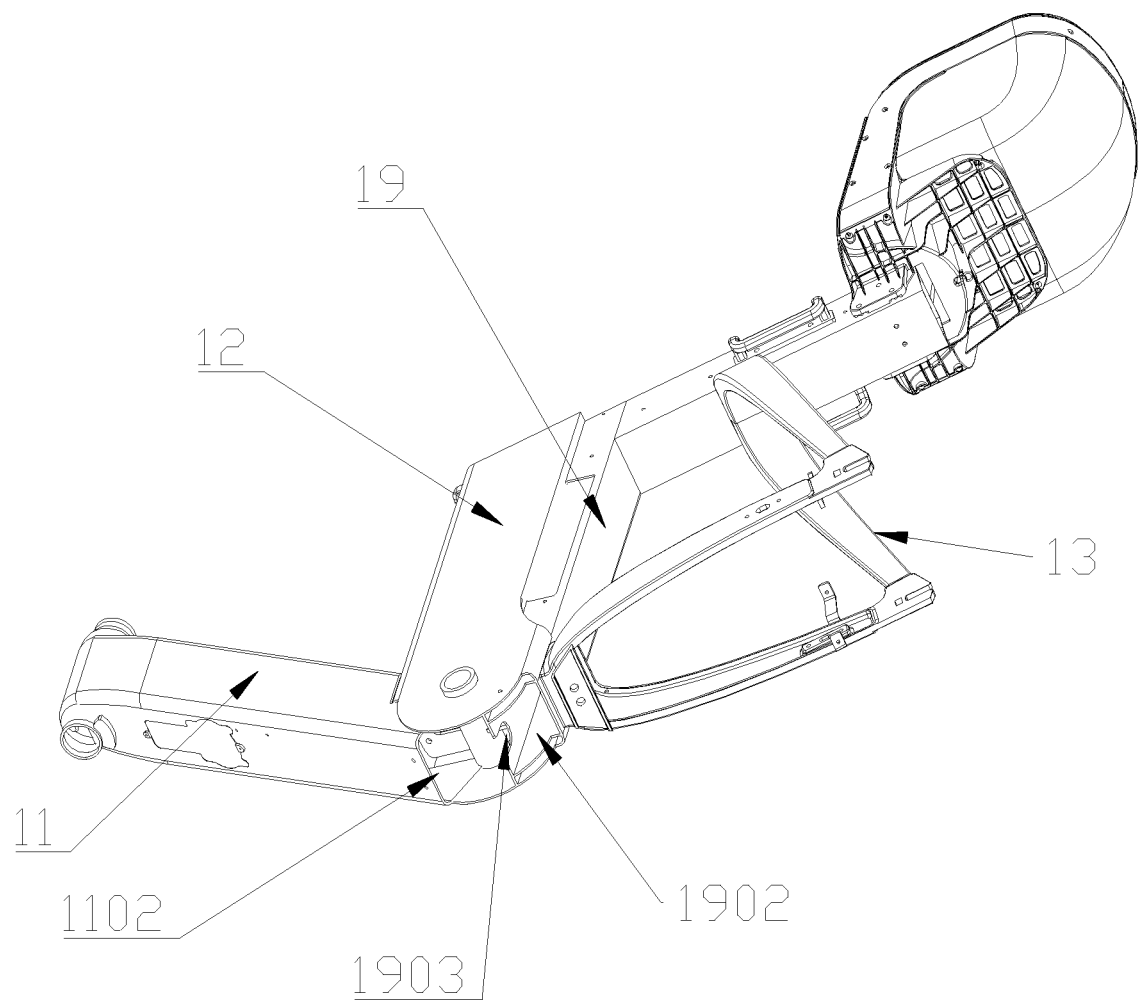
FIG. 4 is a schematic structural diagram of an intelligent safety frame, which is capable of easily replacing and protecting battery, without a bottom of the cushion mounting seat, according to the invention.
Figure 5:
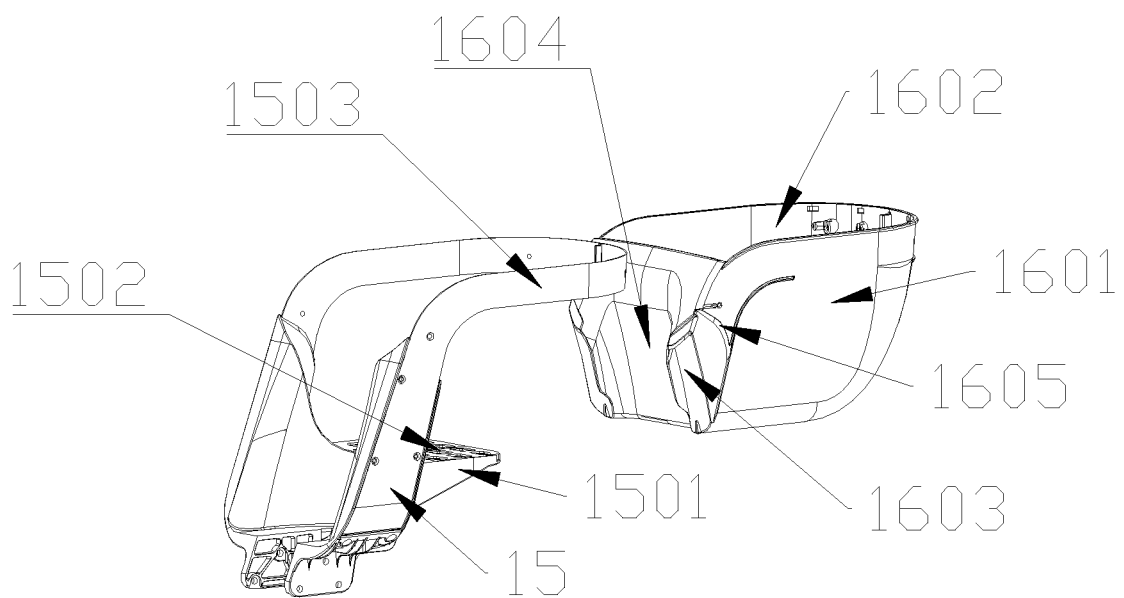
FIG. 5 is a first perspective exploded view of the rear tail box mounting seat and the rear tail box matched in the intelligent safety frame capable of easily replacing and protecting battery, according to the invention.
Figure 6:
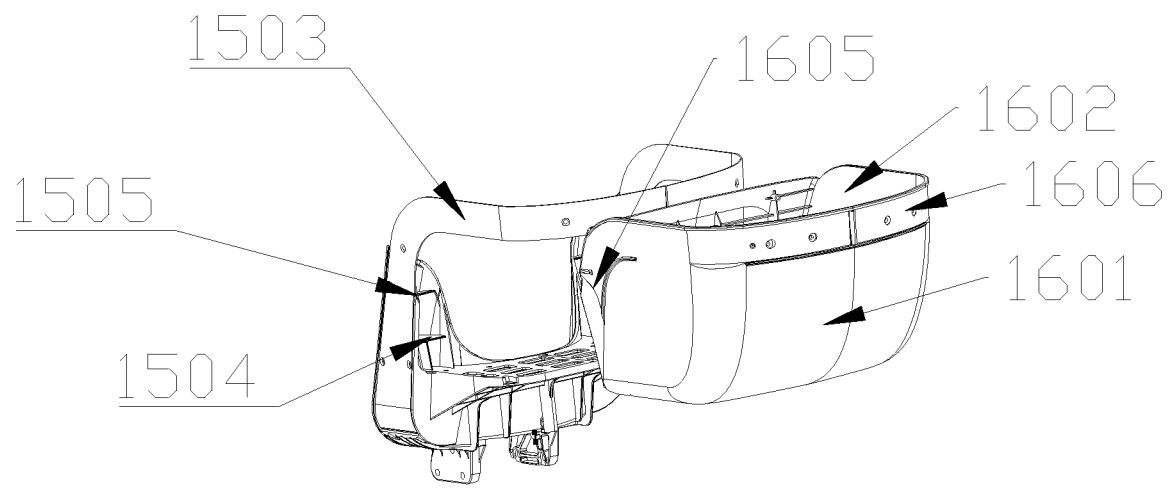
FIG. 6 is a second perspective exploded view of the rear tail box mounting seat and the rear tail box matched in the intelligent safety frame capable of easily replacing and protecting battery, according to the invention.

Referring to FIGS. 1-6, in the embodiment of the invention, an intelligent safety frame capable of easily replacing and protecting a battery is provided, the frame includes a front beam 11 connected with a handlebar, a battery mounting box 12, a rear beam 13 connected with the front beam 11, a cushion mounting seat 14 mounted on the rear beam 13, and a rear tail box mounting seat 15 mounted on the rear beam 13. A rear tail box 16 is mounted on the rear tail box mounting seat 15, the cushion mounting seat 14 is rotatably mounted on the rear beam 13, a battery mounting cavity 1201 is defined in the battery mounting box 12, and a threading box 19 is provided on a side of the battery mounting box 12. Further, a first wire-in cavity 1902 is provided in the threading box 19, a first threading slot 1202 is provided on a side of the battery mounting cavity 1201 close to the first wire-in cavity 1902, and a wire outlet 1901 communicated with the first wire-in cavity 1902 is provided on a side of the threading box 19. A first intelligent lock mounting slot 1301 is provided at the upper end of the rear beam 13, and a lock catch 18 for fixing the cushion mounting seat 14 on the rear beam 13 is provided on a side of the cushion mounting seat 14 close to the rear beam 13.

By leading the connecting wires out from the first threading slot 1202 which is provided on a side of the battery mounting box 12, and through the first wire-in cavity 1902 and to the wire outlet, so the connecting wires of the battery can be set separately from controlling wirings connected with the battery, and power supply wires in different zones, which not only protects the battery but also facilitates the detachment of the battery. Further, a modularized region layout for the wires and the battery is also achieved, making the whole frame structure more compact. In addition, the whole cushion mounting seat 14 ensures that a passage for the battery installation and a passage for the internal wires are shielded and realizes a theft prevention function. Furthermore, the first intelligent lock mounting slot 1301 at the upper end of the rear beam 13 can also be protected by the cushion mounting seat 14; and the frame not only is compact in structure, but also realizes a separate arrangement of the battery and the wires in different zones, which ensures the safety of the battery in use.

In this embodiment, a second threading slot 1903 is provided on a side of the first wire-in cavity 1902 close to the first intelligent lock mounting slot 1301. By arranging the second threading slot 1903 on a side of the first wire-in cavity 1902 close to the first intelligent lock mounting slot 1301, wires of the intelligent lock in the first intelligent lock mounting slot 1301 can be routed through the threading box 19 as well, resulting in a more reasonable and safer wiring layout in the whole frame.

In this embodiment, a second wire-in cavity 1102 is defined in the front beam 11, a second intelligent lock mounting slot 1101 communicated with the second wire-in cavity 1102 is provided on a side of the front beam 11, and a third threading slot is provided on a side of the first wire-in cavity 1902 close to the second wire-in cavity 1102. By arranging the second wire-in cavity 1102 in the front beam 11, and the second intelligent lock mounting slot 1101 communicated with the second wire-in cavity 1102 on a side of the front beam 11, the wires are leaded out from the first wire-in cavity 1902, through a third threading slot and into the second wire-in cavity 1102, and then connected with the intelligent lock mounted in the second intelligent lock mounting slot 1101; and the whole wires are distributed in the front beam 11 and the threading box 19, thus presenting a safer and more reliable wiring layout and ensuring the safety of the wires when the electric vehicle is in use.

In this embodiment, handles 17 are provided on both sides of the rear beam 13.

In this embodiment, the rear tail box mounting base 15 includes a bearing plate 1501 and a fixing collar 1503, in which the rear tail box 16 includes a rear tail box body 1601 and a loading cavity 1602, and the rear tail box body 1601 is mounted on the bearing plate 1501 and is fixed by the fixing collar 1503. With the matching of the bearing plate 1501 with the fixing collar 1503, an omnidirectional limiting and fixing of the rear tail box 16 is realized in the vertical and horizontal directions, and the installation stability of the rear tail box 16 is ensured.

In this embodiment, the bearing plate 1501 is provided with a plurality of hollows 1502. With the hollows 1502 provided on the bearing plate 1501, the weight of the frame is reduced and the requirements of lightweight design of the frame are met.

In this embodiment, a limiting table 1605 is defined on a side of the rear tail box body 1601 close to the bearing plate 1501, and a bearing table 1505 for mounting the limiting table 1605 is provide at the upper end of the bearing plate 1501. With the matching installation of the limiting table 1605 with the bearing table 1505, a seam between the rear tail box 16 and the rear tail box mounting seat 15 can be reduced, the installation stability of the rear tail box 16 is also ensured, and the sideway installation stability of the rear tail box 16 is improved.

In this embodiment, a plurality of reinforcing ribs 1504 are provided on a side of the bearing table 1505 close to the rear tail box body 1601, and a first limiting slot 1603 for an insertion of the reinforcing ribs 1504 is provided on a side of the limiting table 1605 close to the bearing table 1505. By arranging the plurality of reinforcing ribs 1504 on a side of the bearing table 1505 close to the rear tail box body 1601 and arranging the first limiting slot 1603 for an insertion of the reinforcing ribs 1504 on the limiting table 1605, the reinforcing ribs 1504 can improve the strength of the bearing plate 1501 and prevent the deformation of the bearing plate 1501; in addition, with the insertion into the first limiting slot 1603, the installation stability of the rear tail box 16 can be further improved.

In this embodiment, a second limiting slot 1606 sheathed by a fixing collar 1503 is provided on the rear tail box body 1601. Because the second limiting slot 1606 sheathed by a fixing collar 1503 is provided on the rear tail box 16 body, the installation stability of the fixing collar 1503 can be ensured by the second limiting slot 1606, thereby improving the installation stability of the rear tail box 16.

In this embodiment, the threading box 19 is mounted on a side of the battery mounting box 12. By mounting the threading box 19 on a side of the battery mounting box 12, the guiding and arrangement of the connection wires with the battery are thus facilitated.

It can be understood that a bearing surface 1604 for a user to lean against can be provided on a side of the rear tail box body 1601 near the rear tail box mounting seat 15.

It is obvious to those skilled in the art that the invention is not limited to the details of the above-mentioned exemplary embodiments, and can be implemented in other specific forms without departing from the spirit or basic features of the invention. Therefore, the embodiments should be regarded as exemplary and non-limiting in any respect and the scope of the invention is defined by the appended claims rather than the above description; therefore all changes falling within the meaning and scope of the equivalents of the claims are intended to be encompassed in the invention. Any reference number in the claims shall not be regarded as limiting the claims involved.

In addition, it should be appreciated that although this specification is described in terms of embodiments, not every embodiment includes only one independent technical scheme; this kind of describing mode in the specification is for the sake of clarity only; and those skilled in the art should take the specification as a whole, and the technical schemes in each embodiment can also be appropriately combined to form other ones that can be understood by those skilled in the art.

What is claimed is:

1. A safety frame capable of replacing and protecting a battery, comprising a front beam connected with a handlebar, a battery mounting box, a rear beam connected with the front beam, a cushion mounting seat mounted on the rear beam and a rear tail box mounting seat mounted on the rear beam, wherein a rear tail box is mounted on the rear tail box mounting seat, the cushion mounting seat is rotatably mounted on the rear beam, a battery mounting cavity is defined in the battery mounting box, a threading box is provided at a side of the battery mounting box, a first wire-in cavity is provided inside the threading box, a first threading slot is provided on a side of the battery mounting cavity close to the first wire-in cavity, a wire outlet communicated with the first wire-in cavity is provided on a side of the threading box, a first lock mounting slot is provided at an upper end of the rear beam, and a lock catch for fixing the cushion mounting seat on the rear beam is provided on a side of the cushion mounting seat close to the rear beam.

2. The safety frame capable of replacing and protecting the battery according to claim 1, wherein a second threading slot is provided on a side of the first wire-in cavity close to the first lock mounting slot.

3. The safety frame capable of replacing and protecting the battery according to claim 2, wherein a second wire-in cavity is defined in the front beam, the first lock mounting slot communicated with the second wire-in cavity is provided on a side of the front beam, and a third threading slot is provided on a side of the first wire-in cavity close to the second wire-in cavity.

4. The safety frame capable of replacing and protecting the battery according to claim 1, wherein handles are provided on both sides of the rear beam.

5. The safety frame capable of replacing and protecting the battery according to claim 1, wherein the rear tail box mounting seat comprises a bearing plate and a fixing collar, the rear tail box comprises a rear tail box body and a loading cavity, wherein the rear tail box body is mounted on the bearing plate and fixed by the fixing collar.

6. The safety frame capable of replacing and protecting the battery according to claim 5, wherein a plurality of hollows are provided on the bearing plate.

7. The safety frame capable of replacing and protecting the battery according to claim 6, wherein a limiting table is provided on a side of the rear tail box body close to the bearing plate, and a bearing table for mounting the limiting table is provide at an upper end of the bearing plate.

8. The safety frame capable of replacing and protecting the battery according to claim 7, wherein a plurality of reinforcing ribs are provided on a side of the bearing table close to the rear tail box body, and a first limiting slot for an insertion of the reinforcing ribs is provided on a side of the limiting table close to the bearing table.

9. The safety frame capable of replacing and protecting the battery according to claim 8, wherein a second limiting slot sheathed by a fixing collar is provided on the rear tail box body.

10. The safety frame capable of replacing and protecting the battery according to claim 1, wherein the threading box is installed on a side of the battery mounting box.

* * * * *